Aug. 27, 1946.  W. R. TUCKER  2,406,482
HYDRAULICALLY CONTROLLED MACHINE TOOL
Filed April 27, 1942  2 Sheets-Sheet 2
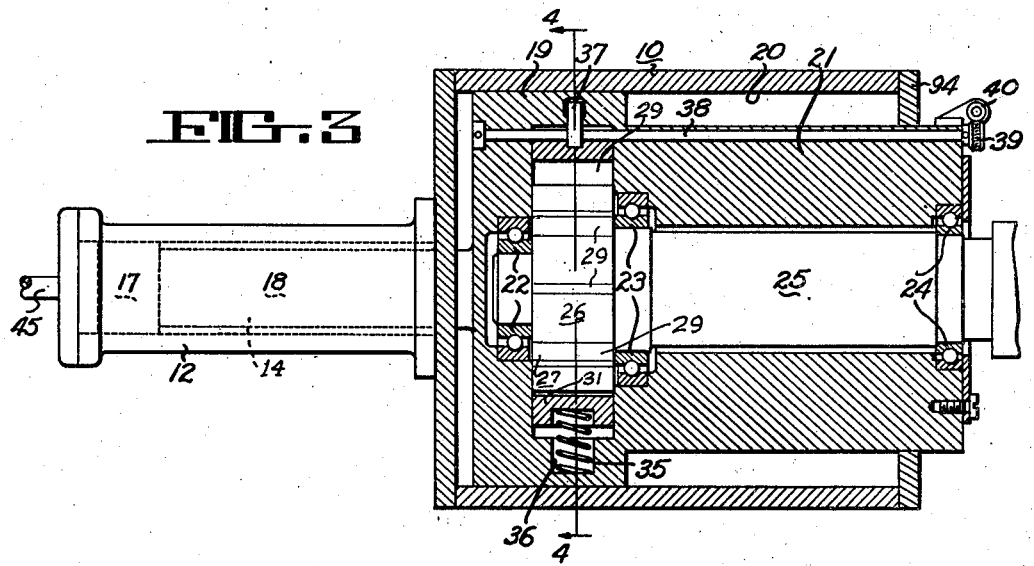
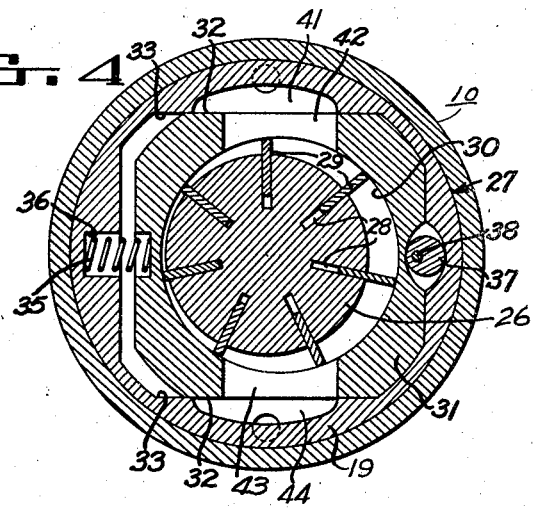
INVENTOR
*WARREN R. TUCKER*
BY
*Toulmin & Toulmin*
ATTORNEYS Patented Aug. 27, 1946

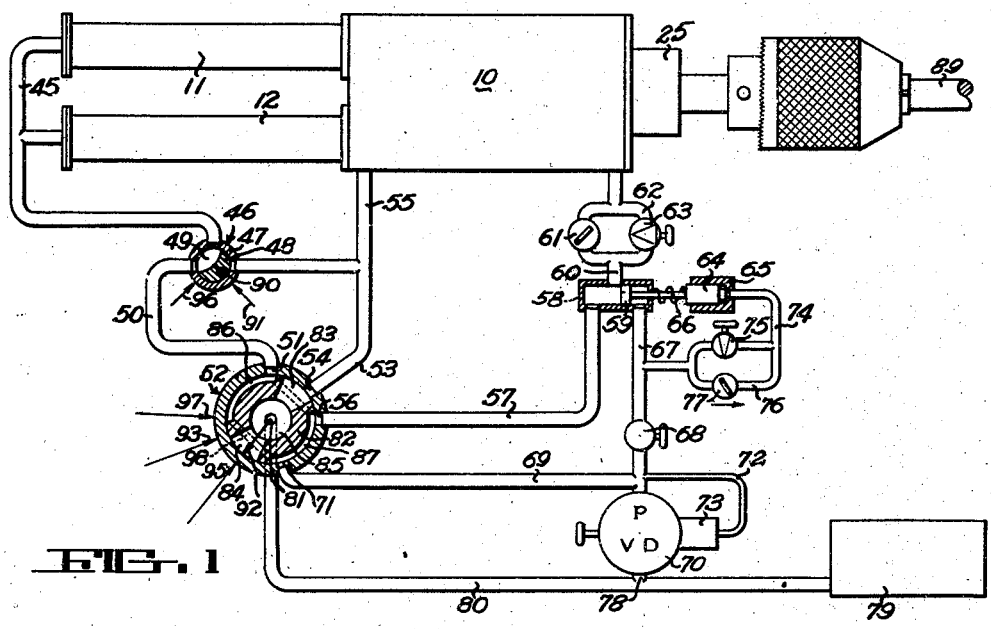

2,406,482

UNITED STATES PATENT OFFICE 2,406,482

HYDRAULICALLY CONTROLLED MACHINE TOOL

Warren R. Tucker, Dayton, Ohio, assignor to The Hydraulic Development Corporation, Inc., Wilmington, Del., a corporation of Delaware Application April 27, 1942, Serial No. 440,733

6 Claims. (Cl. 60—52)

This invention relates to hydraulic machinery and, in particular, to hydraulically controlled machine tools.

It is an object of this invention to provide a hydraulically powered and controlled device adapted to perform a combined rotary and reciprocating motion, such as drilling, reaming and honing.

It is another object to provide a device including a reciprocable member which may be hydraulically controlled so as selectively to be reciprocated, for instance for broaching or pressing purposes, or so as simultaneously to be reciprocated and rotated for operations, such as drilling, reaming and honing.

It is another object of the invention to provide a device which comprises a member adapted simultaneously to be reciprocated and rotated hydraulically, and in which the reciprocable member will automatically be retracted temporarily in response to a predetermined resistance encountered by said member, and will again be advanced when said resistance has decreased.

A still further object of the invention consists in the provision of a hydraulic system comprising a plurality of members adapted simultaneously to be reciprocated and rotated, in which the reciprocative and rotative movement of said members may be controlled by a single pressure fluid source.

These and other objects and advantages of the invention will appear more clearly from the following specification in connection with the accompanying drawings, in which:

Figure 1 diagrammatically illustrates a machine tool according to the invention.

Figure 2 shows, on a larger scale, a partial section of the device illustrated in Figure 1.

Figure 3 is a section along the line 3—3 of Figure 2.

Figure 4 is a section along the line 4—4 of Figure 3.

Figure 5 shows a system including a plurality of machine tools according to the invention.

General arrangement

The device according to the present invention consists of a fluid operable plunger rotatably supporting a tool holder, and a hydraulically operable rotary motor for rotating said tool holder.

Furthermore, control means are provided which are adapted to control the supply of pressure fluid to the fluid operable plunger and the rotary motor so as selectively to cause reciprocation and simultaneously rotation of the tool holder, or to reciprocate said tool holder without rotating the same.

When the tool holder is to be advanced while it is rotating, as is the case when drilling, hydraulically operable control means may, according to another feature of the invention, be provided, which will cause a temporary retraction of the tool holder if the rotation of the tool is accidentally stopped, for instance, when the tool encounters undue resistance in the material to be machined.

Structural arrangement

Referring now to the drawings in detail, the device shown therein comprises a casing, generally designated 10, having connected thereto, in any convenient manner, two cylinders 11 and 12, in which are reciprocably mounted two plungers 13 and 14 respectively.

The plunger 13 comprises a piston 15 connected to a piston rod 16, while the plunger 14 comprises a piston 17 connected to a piston rod 18. The piston rods 16 and 18 are connected, in any desired manner, with a piston 19 reciprocable in the cylinder bore 20 and connected to a piston shaft 21. The piston 19 and piston shaft 21 are hollow and have mounted therein anti-friction bearings 22, 23 and 24 which, in their turn, support a tool holder 25. The tool holder 25 is rotatable within the piston 19 and piston shaft 21 and has rigidly connected thereto a rotor 26 of a rotary motor 27, which may be of any desired type, preferably of the type shown in Figure 4. According to Figure 4, the rotor 26 is provided with a plurality of radial slots 28 having reciprocably mounted therein vanes 29 which engage the inner periphery 30 of the motor casing 31.

The motor casing 31 is provided with two opposed flat surfaces 32 slidable on correspondingly shaped surfaces 33 in piston 19. The motor casing 31 is continuously urged toward the right with regard to Figure 4 by means of a spring 35, one end of which rests in a recess 36 provided in the piston 19, while the other end of the spring 35 engages the motor casing 31.

An eccentric 37 is provided which is connected to a control rod 38 (Figure 3), which latter is rotatable by means of a worm wheel 39 and worm 40. By rotating the eccentric 37 from the position shown, the motor casing 31 will be shifted toward the left with regard to Figure 4 against the thrust of the spring 35.

The inner space of the motor casing 31 is adapted to communicate with a passageway 41 through a bore 42 in the motor casing 31. A bore 43 is adapted to connect a portion of the interior of the motor casing 31 with a passageway 44. The passageway 44 leads through the plunger 14 and communicates with a conduit 45 which, in its turn, communicates with one end of the cylinder 11 and also communicates with a valve 46. The valve 46 comprises a valve casing 47 and a rotor 48, rotatable in the casing 47 and is provided with a recess 49 adapted in one position to connect the conduit 45 with a conduit 50 leading to a port 51 of a control valve generally designated 52.

When the valve rotor 48 is shifted in clockwise direction by 90 degrees from the position shown in Figure 1, it connects the conduit 45 with a conduit 53 leading to a port 54 in the control valve 52. Branching off from the conduit 53 is a conduit 55 which communicates with the left side of the piston 19 (Fig. 2) and with the right side of the pistons 15 and 17. The control valve 52 furthermore comprises a port 56 which communicates with a conduit 57 leading to a three-way valve 58. The three-way valve 58 comprises a valve member 59 adapted in one position to cause connection between the conduit 57 and a conduit 60, which latter includes a check valve 61 and leads to the right end of the cylinder bore 20. The check valve 61 may be by-passed by a conduit 62 containing an adjustable choke 63.

The valve member 59 has connected thereto a plunger 64 which is reciprocably mounted in a cylinder 65. A spring 66 normally urges the plunger 64 into its right hand end position, at which position the conduits 57 and 60 communicate with each other, while fluid connection is prevented between the conduit 60 and conduit 67, which latter includes a shutoff valve 68 and leads to a conduit 69. The conduit 69 has one end connected to the pressure side of a variable delivery pump 70, while the other end of the conduit 69 leads to a port 71 in the control valve 52.

Branching off from the conduit 69 is a pilot line 72 leading to a servomotor 73 of the pump 70, which servomotor is adapted in response to a predetermined pressure in the conduit 69 to shift the pump 70 to substantially neutral or no delivery position. Servomotors of this type are well known in the art and disclosed, for instance, in U. S. Patent No. 2,038,272 to Walter Ernst.

Branching off from the conduit 67 is a pilot line 74 leading to the cylinder 65 and including an adjustable choke 75. The choke 75 may be by-passed by a conduit 76 containing a check valve 77. The suction side of the pump 70 is connected through a conduit 78 with a fluid reservoir or surge tank 79 which, in its turn, is connected through a conduit 80 with a port 81 in the control valve 52. The ports 51, 54, 56 and 71 are controlled by a valve rotor 82 having two oppositely located bores or passageways 83 and 84. The bores 83 and 84 communicate with a bore 85, which latter is in continuous communication with the exhaust conduit 80 through the port 81. The valve rotor 82 also includes two oppositely located recesses 86 and 87 which are interconnected by means of cross passages 98.

Referring now to Figure 5, the system described therein differs from that of Figure 1 in that a plurality of machine tools are provided and operated by a single pump 70a, which fully corresponds to the pump 70 of Figure 1. Inasmuch as most of the structural parts in the system of Figure 5 correspond to the structural elements referred to in connection with the description of Figure 1, a detailed description of Figure 5 appears to be superfluous and corresponding parts have, therefore, been designated with the same reference numerals as in Figure 1, however, with the additional letter a. The hydraulic system of Figure 5 differs somewhat from that of Figure 1 and comprises a plurality of automatic feed control valves 88, preferably of the type disclosed in United States Patent No. 2,146,537 to Farnham. The valves 88 are provided in order to cause even distribution of the pressure fluid delivered by the pump 70a to the various casings 10a, 10b and 10c housing the driving means or the tool holders 25a, 25b and 25c.

As will be seen from Figure 5, the tool holders 25a, 25b and 25c are controlled by a single control valve 52a and a single valve 46a, corresponding to the valves 52 and 46 respectively of Figure 1. The arrangement of Figure 5 is not provided with a three-way valve corresponding to the valve 58 of Figure 1 and a cylinder piston system 65, 64 for operating the latter and bringing about a temporary retraction stroke of the tool holder.

*Operation*

To operate the device of Figure 1 for drilling, i. e., to cause the drill 89 simultaneously to reciprocate and to rotate, the operator shifts the valve rotor 48 into the position shown in Figure 1, in which the mark 90 is in alignment with the mark 91. The operator furthermore shifts the valve rotor 82 so that the mark 92 is in alignment with the mark 93. Thereupon the operator actuates the eccentric 37 so as to shift the motor 27 to a desired stroke and starts the pump 70. Pressure fluid from the pump 70 now flows through the conduit 69, the recesses 87 and 86 of the valve rotor 82, the port 51, and the conduit 50 into the recess 49. From here the fluid passes through the conduit 45 into the cylinders 11 and 12, where it acts upon the pistons 15 and 17. As a result thereof, the piston 19 and piston shaft 21 move toward the right with regard to Figure 2.

During this movement, the fluid between the right end of the piston 19 and the bottom 94 of the cylinder bore 20 is expelled through the conduit 60 and passes through the choke valve 63, the three-way valve 58 and conduit 57 into the recess 83 of the valve rotor 82. From here the fluid passes through the bore 85, port 81 and conduit 80 into the fluid reservoir or tank 79. The setting of the choke valve 63 will determine the rightward or advancing speed of the piston 19 and piston shaft 21 carrying the tool holder 25.

Simultaneously with the admission of pressure fluid to the cylinders 11 and 12, a portion of the pressure fluid in the conduit 45 passes through the passageway 44 and the bore 43 into the interior of the motor casing 31, where it acts upon the adjacent vanes 29 so as to cause rotation of the motor 26, rigidly connected to the tool holder 25. Consequently, the drill 89 is now advanced and simultaneously rotated. The fluid expelled from the interior of the motor casing 31 by the vanes 29 passing by the bore 42 flows through passageway 41 and, in part, fills the space on the left side of the piston 19 and, in part, returns through the conduits 55 and 53 and also through recess 83, bore 85, port 81 and conduit 80 to the tank 79.

If, during the actual drilling operation, the drill 89 should happen to encounter undue resistance, so that the rotation of the drill 89 is stopped, the pressure in the bore 43 of the motor casing 31 and, consequently, also in the passageway 44 and conduit 45, increases. When this pressure has reached a predetermined value and assuming that the valve 68 is in its open position, the said pressure acts through the pilot lines 67, 76 and 74 upon the plunger 64 so as to cause the latter to shift the valve member 59 to move toward the left against the thrust of the spring 66, thereby interrupting fluid connection between the conduits 57 and 60, while establishing fluid connection between the latter and the conduit 67. Pressure fluid from the pump 70 now passes through the conduits 61 and 60 and the check valve 61 into the right hand end portion of the cylinder bore 20, where it acts upon the right hand area of the piston 19 so as to initiate a retraction stroke of the piston 19 and piston shaft 21 and, consequently, also of the tool holder 25 supported thereby. It will be noted that the total effective area on the right hand of the piston 19 is larger than the combined area of the pistons 15 and 17, while the left hand area of the piston 19 still remains connected to the tank 79. This immediately reduces the resistance encountered by the drill 89. As a result thereof, the pressure prevailing in the passageway 44 and bore 43 is again able to rotate the rotor 26 and, thereby, the tool holder 25 so that the drill 89 again rotates. Therefore, the pressure in the conduit 45 again drops, which also results in a reduction of the pressure in the pilot line 74. Consequently, the spring 66 again moves the plunger 64 and the valve member 59 into their initial position shown in Figure 1. This re-establishes the previous condition, in which the conduits 60 and 57 communicate with each other, while fluid connection is prevented between the conduits 60 and 67. The conduit 60, therefore, is again connected to the tank 79, and the pressure acting on the pistons 15 and 17 moves the piston shaft 21 and, thereby, the tool holder 25 to the right. In this way, the advancing movement of the drill is continued for completion of the working operation.

When the working operation has been completed, the operator shifts the valve rotor 82 in anti-clockwise direction so that the mark 92 will be in alignment with the mark 95. In this position, the conduits 50 and 57 will be connected through the recesses 86 and 87 and the bores 98 with the pressure line 69, while the conduit 53 communicates through the passageway 83, bore 85 and port 81 with the conduit 80 leading to the tank 79. Consequently, pressure fluid from the pump 70 passes through the recess 86, conduits 50 and 45 into the left end of the cylinders 11 and 12.

A part of the pressure fluid in conduit 45 passes through the passageway 44 and into the motor casing 31 where it acts upon the vanes 29 so as to rotate the rotor 26. In other words, the drill 89 continues its rotation. Simultaneously, pressure fluid from the pump 70 flows through the conduit 69, recess 87, conduit 57, three-way valve 58 and conduit 60 into the right hand end of the cylinder bore 20 where it acts upon the right hand side or retraction side of the piston 19.

Inasmuch as the effective retraction area of the piston 19 is larger than the total area of the pistons 15 and 17, as mentioned above, the piston shaft 21 moves toward the left, while the tool holder 25 still rotates. In this way, the drill 89 is retracted from the work piece which has just been machined.

When the piston 19 has reached the end of its retraction stroke, and it is desired to stop rotation of the drill, the operator shifts the valve rotor 48 in clockwise direction so that the mark 90 will be in alignment with the mark 96. This interconnects the conduits 45 and 53, while preventing fluid communication between the said two conduits and the conduit 50. Consequently, the pressure in the conduit 60 soon increases to such an extent that, while being conveyed through the conduits 57, 69 and the pilot line 72, it actuates the servomotor 73 so as to shift the pump 70 to neutral or no delivery position.

If it is now desired to reciprocate the tool holder 25, for instance for broaching or for pressing purposes, the operator replaces the drill 89 by a corresponding broaching device or by a desired pressing plunger. Thereupon the operator closes the shutoff valve 68 and shifts the valve rotor 82 in clockwise direction so that the mark 92 will be in alignment with the mark 97. It will be noted that, during this shifting movement, the valve rotor 82 passes its previous position for simultaneously advancing and rotating the tool holder 25. However, since now the mark 90 of the valve rotor 48 is in alignment with the mark 96, the fact that the valve rotor during the said shifting movement passes its previous position has no effect whatsoever on the tool holder 25.

When the valve rotor 82 occupies the position in which the marks 92 and 97 register with each other, pressure fluid from the line 69 is conveyed through the recesses 87 and 86, which are interconnected through the passageway 98 into the conduit 53. From here the pressure fluid passes through the conduit 55 to the left hand or advancing area of the piston 19. Simultaneously, fluid passes from the conduit 53 through the recess 49 and the conduit 45 to the left end of the cylinders 11 and 12.

Since, on the other hand, the conduit 60 is connected through the three-way valve 58, the conduit 57, recess 83, bore 85, port 81 and conduit 80 with the tank 79, the piston 19 moves toward the right, thereby advancing the tool holder 25. It will be noted that, during this advancing movement of the tool holder 25, no rotation of the latter takes place, since pressure fluid prevails in the passageway 44 as well as in the passageway 41, so that the pressure on both sides of the motor 27 is balanced and no rotation of the rotor 26 is effected.

When the piston 19 has reached the end of its advancing stroke, the pressure in conduit 69 increases and, being conveyed through the pilot line 72, actuates the servomotor 73 so as to move the pump 70 to neutral or no delivery position. Consequently, the tool holder 25 comes to a halt.

To effect a retraction stroke of the tool holder 25, the operator rotates the valve rotor 82 in anti-clockwise direction until the mark 92 registers with the mark 95. Fluid pressure from the pump 70 then passes through the conduit 69, recess 87, conduit 57, three-way valve 58, conduit 60 and check valve 61 into the right hand end of the cylinder bore 20, where it acts upon the retraction side of the piston 19. In this position of the valve rotor 82, the conduits 53, 55 and 45 are connected through the passageway 83, bore 85, port 81 and conduit 80 with the fluid tank 79. Therefore, the pressure now acting on the retraction side of the piston 19 moves the latter and, thereby, the tool holder 25 toward the left so as to retract the tool holder 25.

When the tool holder 25 has reached the end of its retraction stroke, increased pressure builds up in the conduit 69 and, through the pilot line 72, causes the servomotor 73 to shift the pump 70 into neutral or no delivery position. The device is then ready for a new cycle and, depending on the position of the valve rotors 48 and 82, may again perform a cycle in which the tool holder 25 reciprocates while simultaneously rotating, or reciprocates without rotation.

In case the device shown in Figure 1 is to be used for milling purposes or for any purpose where rotation alone is desired, the operator locks the piston shaft 21 by means of the lock screw 99, thereby preventing any movement of the piston shaft 21. The fluid pressure then delivered through the conduit 45 and passageway 44 to the motor 27 will then be used merely for rotating the tool holder 25 which, in this instance, carries a milling tool.

From the above it will be clear that the device of Figure 1 is of great universal use, inasmuch as the tool holder 25 may selectively be advanced and simultaneously rotated, or may be rotated without being advanced, or may be advanced without being rotated.

It should also be noted that the adjustment of the choke valve 63 will control the rate of advancement of the tool holder 25, while the speed of rotation of the tool holder 25 may be varied in accordance with the adjustment of the eccentric 37 and the eccentricity of the inner periphery 30 of the motor casing 31, relative to the periphery of the rotor 26.

It will furthermore be noted that by adjusting the choke 75 the initiation of the advancement of the tool holder 25, following a temporary retraction of the latter, can be more or less delayed, thereby assuring that, when the tool holder is again advanced, a proper advancing pressure is acting upon the latter.

Referring now to the arrangement of Figure 5, the operation thereof is similar to that described above in connection with Figure 1. By movement of the valve rotor of the valve 46a and shifting the valve rotor of the valve 52a into the positions referred to in connection with the description of the device shown in Figure 1, the tool holders 25a, 25b and 25c may selectively be advanced and simultaneously rotated, or may be reciprocated without being rotated. By locking the tool holders 25a, 25b and 25c, by means of the locking screws 99a, 99b and 99c, and a corresponding position of the valves 46a and 52a, the tool holders 25a, 25b and 25c may be rotated without being reciprocated.

It will be noted that a single pump, namely the pump 70a, supplies fluid for actuating the several tool holders 25a, 25b and 25c, while the fluid motor in each of the casings 10a, 10b and 10c may be adjusted for any desired ratio of rotary speed, the actual speeds being a function of the quantity of fluid supplied through the valves 88. This constitutes a material advance and saving over similar devices heretofore known, in which it was necessary to provide an electromotor for each of the tool holders in order to allow operation of each of the tool holders at a different speed.

It will be understood that I desire to comprehend within my invention such modifications as come within the scope of the claims.

Having thus fully described my invention, what I claim as new and desire to secure by Letters Patent, is:

1. In combination, a reciprocable member, fluid operable advancing and retracting means associated with said member for reciprocating the same, fluid operable motor means operable selectively for rotating said member while it is being reciprocated, and means adapted in response to a predetermined resistance exerted upon said reciprocable member, during the advancing stroke thereof, for temporarily retracting said member, and also adapted in response to a decrease in the said resistance to again advance said member.

2. In combination, a reciprocable member, fluid operable advancing and retracting means associated with said member for reciprocating the same, fluid operable motor means operable to rotate said member while it is being reciprocated, a single valve controlling the supply of fluid to said motor means for selectively causing said reciprocable member to reciprocate while simultaneously rotating, or to reciprocate without rotating, and means responsive to a predetermined resistance exerted on said member for temporarily halting the reciprocation of said member.

3. In combination, a reciprocable member, fluid operable advancing and retracting means associated with said member for reciprocating the same, fluid operable motor means operable selectively for rotating said member while it is being reciprocated, control means for controlling the supply of pressure fluid selectively to said advancing or said retracting means, pressure responsive means responsive to a predetermined pressure at the inlet side of said motor means while said member is being advanced for causing a temporary retraction of said reciprocable member, and means associated with said pressure responsive means and operable subsequently to the actuation of the latter in response to a decrease in the pressure at the inlet side of said motor means below said predetermined pressure for again advancing said reciprocable member.

4. In combination, a reciprocable member, fluid operable advancing and retracting means associated with said member for reciprocating the same, fluid operable rotary motor means associated with said reciprocable member and operable selectively to rotate the latter while it is being reciprocated, means operable selectively for varying the speed of rotation of said reciprocable member, means adapted in response to a predetermined resistance exerted upon said reciprocable member, during the advancing stroke thereof, for retracting said member and also adapted, in response to a decrease in said resistance, to again advance said member and means controlling the rate of advance from said retracted position.

5. In combination, a reciprocable member, fluid operable advancing and retracting means associated with said member for reciprocating the same, fluid operable rotary motor means associated with said reciprocable member and operable selectively to rotate the latter while it is being reciprocated, channel means in said reciprocating member for supplying pressure fluid to said rotary motor, and a single valve operable to control said reciprocable member and said fluid motor.

6. In combination, a machine tool spindle, first fluid motor means selectively operable for reciprocating said spindle to and from work engaging position, second fluid motor means for selectively driving said spindle in rotation, and fluid operable means responsive to a predetermined work resistance encountered by said spindle for momentarily varying the supply of fluid to said first motor means for retracting said spindle from work engaging position and for returning said spindle to work engaging position after a predetermined time period, and a single valve for controlling the supply of fluid to said motors for actuating said motors simultaneously or said first motor independently.

WARREN R. TUCKER.